United States Patent [19]

Friedlaender et al.

[11] Patent Number: 4,560,484
[45] Date of Patent: Dec. 24, 1985

[54] METHOD AND APPARATUS FOR MAGNETICALLY SEPARATING PARTICLES FROM A LIQUID

[75] Inventors: Fritz J. Friedlaender; Makoto Takayasu, both of West Lafayette, Ind.

[73] Assignee: Purdue Research Foundation, West Lafayette, Ind.

[21] Appl. No.: 321,411

[22] Filed: Nov. 16, 1981

Related U.S. Application Data

[63] Continuation of Ser. No. 143,607, Apr. 25, 1980, abandoned.

[51] Int. Cl.$^4$ .............................................. B01D 35/06
[52] U.S. Cl. ..................................... 210/796; 210/223
[58] Field of Search ....................... 210/222, 223, 695; 209/212, 213, 214

[56] References Cited

U.S. PATENT DOCUMENTS

| | | | |
|---|---|---|---|
| 3,466,154 | 9/1969 | Hori et al. | 209/214 |
| 3,483,969 | 12/1969 | Rosenweig | 210/695 |
| 3,703,958 | 11/1972 | Kolm | 210/695 |
| 4,108,767 | 8/1978 | Cooper | 210/695 |
| 4,144,163 | 3/1979 | Kolm | 209/214 |
| 4,187,170 | 2/1980 | Westcott et al. | 209/214 |
| 4,214,981 | 7/1980 | Giddings | 210/695 |
| 4,230,685 | 10/1980 | Senyei | 210/222 |
| 4,235,710 | 11/1980 | Sun | 210/222 |
| 4,309,290 | 1/1982 | Heitkamp | 210/222 |

OTHER PUBLICATIONS

Friedlaender, et al, IEEE Transactions on Magnetics, vol. Mag-14, No. 6, Nov. 1978, pp. 1158–1164 (Friedlaender 1978).

Friedlaender et al, IEEE Transactions on Magnetics, vol. Mag-15, No. 6, Nov. 1979, pp. 1526–1528 (Friedlaender 1979).

Handbook of Chemistry and Physics–PE–119, B–102, 49th Edition Chemical Rubber Co., Cleveland, Ohio 44128.

Primary Examiner—Marc L. Caroff
Assistant Examiner—Sharon T. Cohen
Attorney, Agent, or Firm—O'Rourke & Harris

[57] ABSTRACT

A method and apparatus are disclosed for magnetically separating particles from a liquid, which particles include diamagnetic, non-magnetic and/or very weakly paramagnetic particles. To achieve separation, the magnetic susceptibility of the liquid is modified, such as through dissolving a paramagnetic substance (such as manganese chloride) or a diamagnetic substance (such as bismuth diiodide) in a liquid (such as water, alcohol or glycerine), after which the modified paramagnetic liquid is passed through a filter formed of magnetic material in a magnetic field with the filter being preferably formed of ferromagnetic material establishing a high gradient magnetic filter. Selective filtering of particles is also provided by modifying the susceptibility of the liquid to be identical to that of one group of particles included in the liquid but different from a second group of particles, whereby the one group of particles and the liquid can be passed through the filter while the second group of particles is separated from the liquid by the filter.

16 Claims, 7 Drawing Figures

MAGNETIC SUSCEPTIBILITY, $X_f$, RELATIVE VISCOSITY, $\eta/\eta_0$, AND $X_f/(\eta/\eta_0)$ AS A FUNCTION OF $MnCl_2$ CONCENTRATION.

RELATIVE ACCUMULATION RADIUS, $R_a$, AS A FUNCTION OF TIME FOR Al, ($H_0$=8.0 KOe, C=0.4g/L, V=1.03 cm/s).

METHOD AND APPARATUS FOR MAGNETICALLY SEPARATING PARTICLES FROM A LIQUID

GOVERNMENT RIGHTS

The Government has rights in this invention pursuant Grant No. 79-104-ENG-76-23702 awarded by the National Science Foundation.

RELATED INVENTION

This application is a continuation of our co-pending U.S. application Ser. No. 143,607, filed Apr. 25, 1980.

FIELD OF THE INVENTION

This invention relates to a method and apparatus for magnetically separating particles from a liquid and, more particularly, relates to magnetically separating diamagnetic, non-magnetic and/or very weakly paramagnetic particles from a liquid.

BACKGROUND OF THE INVENTION

Separation of particles magnetically is well established in the prior art. Initially, such separation was utilized for separation of ferromagnetic materials, and filters have been developed which have become quite effective for accomplishing this end.

One of the best systems heretofore developed for separation of magnetic particles has utilized high gradient magnetic separation. With high gradient magnetic separation, it is possible to separate magnetic particles of small size and, in addition, to also separate very small particles that are only weakly paramagnetic. In high gradient magnetic separation, a matrix of magnetic material having sharp edges (such as, for example, steel wool) is placed in a steady magnetic field so that positive high gradient magnetic fields are created near the sharp edges of the material making up the matrix. When a carrier (liquid or gas), having particles to be separated included therein, is passed through the filter, particles are attracted to the material of the matrix and held there by the established magnetic forces.

In the collection of paramagnetic or ferromagnetic particles in magnetic separation, a gradient is created which forces the paramagnetic or ferromagnetic particles toward a wire in the direction of an applied field. The resulting field distortion is a positive gradient which exerts a force on a magnetized particle. If the particle magnetization is positive, as for ferromagnetic (or ferrimagnetic) particles, the force is directed toward the wire and collection results if the magnetic force exceeds the competing forces (such as, for example, hydrodynamic drag).

With respect to modifying a liquid for magnetic-gravimetric methods—quite distinct from high gradient magnetic separation—the following is referenced: (1) Y. Zimmels and I. Yaniv, IEEE Trans. Magn., Vol. MAG-12, No. 4, pp. 359-368, July 1976; and (2) S. E. Khalafalla, IEEE Trans. Magn., Vol. MAG-12, No. 5, pp. 455-462, September 1976.

With respect to high gradient magnetic separation, the following is referenced: (1) D. R. Kelland, et al., Supervonducting Machines and Devices, S. Foner and B. B. Schwartz (ed), Chapter 10, Plenum Press, New York, 1974; (2) M. E. Arellano, G. Zambrana and C. Soux, Proc. International Tin Symposium, La Paz, Bolivia, November, 1977; (3) D. R. Kelland, IEEE Transactions on Magnetics, Vol. MAG-9, No. 3, pp. 307-310, September 1973; (4) F. E. Lubrosky and B. J. Drummond, IEEE Trans. Magn., MAG-11, p. 1696, 1976; (5) E. E. Lubrosky and B. J. Drummond, IEEE Trans. Magn. MAG-12, p. 474, 1976; (6) C. Cowen and F. J. Friedlaender, IEEE Trans. Magn. MAG-13, p. 1483, 1977; and (7) IEEE Trans. Magn. Vol. MAG-12, No. 5, 1976.

With respect to prior art patents directed at least generally to separation of diamagnetic or nonmagnetic particles, the teachings of such patents appear to fall within two categories: (1) coating or combining non-magnetic or weakly magnetic particles with magnetic particles using solid magnetic particles to collect the desired particles; and (2) magneto-gravimetric methods. Such patents are, for example, U.S. Pat. Nos. 4,125,460; 4,113,608; 4,089,779; 4,087,004; 4,085,037; 4,062,765; 3,929,627; 3,926,789; 3,923,651 and 933,717.

Separation has, however, not been satisfactorily achieved with respect to diamagnetic, non-magnetic or very weakly paramagnetic particles. This is believed to be due to the very small forces (i.e., the small magnetizations), in most cases, on diamagnetic particles even in high gradient magnetic fields.

Recently, consideration of the physics of field gradients has shown that there are regions of negative gradient as well as regions of positive gradient surrounding a ferromagnetic wire in a transverse field, and this has been reported in "Diamagnetic Capture in Single Wire HGMS", IEEE Trans. Magn. MAG-15, No. 6, November 1979 by F. J. Friedlaender, M. Takayasu and T. Nakano.

SUMMARY OF THE INVENTION

This invention provides an improved method and apparatus for magnetically separating particles from a liquid, and a method and/or apparatus that is particularly well suited for separating diamagnetic, non-magnetic and very weakly paramagnetic particles from a liquid by modifying the susceptibility of the liquid and passing the modified liquid with the particles therein through a filter in a magnetic field, which filter is preferably a high gradient magnetic filter.

It is therefore an object of this invention to provide an improved method and apparatus for magnetically separating particles from a liquid.

It is still another object of this invention to provide an improved method and apparatus for magnetically separating particles from a liquid by modifying the liquid and passing the modified liquid through a magnetic filter to separate particles therefrom.

It is still another object of this invention to provide a method and apparatus for magnetically separating diamagnetic, non-magnetic and/or very weakly paramagnetic particles from a liquid.

It is yet another object of this invention to provide a method and apparatus for magnetically separating diamagnetic, non-magnetic and/or very weakly paramagnetic particles from a liquid by modification of the liquid to make the liquid paramagnetic or diamagnetic and passing the modified liquid through a magnetic filter.

It is yet another object of this invention to provide a method and apparatus for magnetically separating particles from a liquid by controlling the susceptibility of the liquid and passing the same through a high gradient magnetic filter.

It is still another object of this invention to provide a method and apparatus for selectively separating particles from a liquid by controlling the susceptibility of the liquid and passing the same through a magnetic filter.

With these and other objects in view, which will become apparent to one skilled in the art as the description proceeds, this invention resides in the novel construction, combination, arrangement of parts and method substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to one of the best modes so far devised for the practical application of the principles thereof, and in which.

DESCRIPTION OF THE INVENTION

By this invention, diamagnetic, non-magnetic and very weakly paramagnetic particles can be removed, together or selectively, from a liquid which is paramagnetic or diamagnetic and acts as the carrier of the particles through a magnetic filter.

To make the liquid paramagnetic, generally salts of transition metals, such as iron, manganese, nickel, etc. have been found to be the most suitable, while solutions which contain bismuth ions have been found to be suitable for making the liquid diamagnetic where the material has to be made from a salt to be soluble in the liquid selected.

Figure 1:
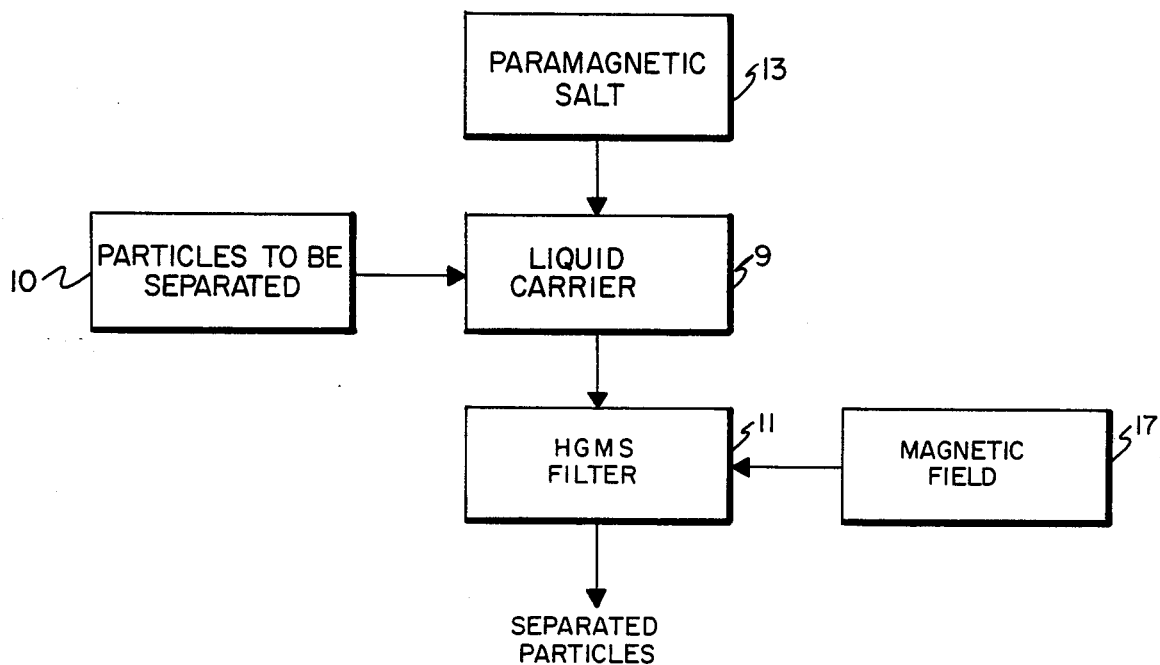
FIG. 1 is a flow diagram in block form illustrating the apparatus of this invention.

As shown in FIG. 1, this invention makes possible the capture of such diamagnetic, non-magnetic and very weakly paramagnetic particles through the modification of the susceptibility of a liquid carrier 9, which carries the particles 10 to be separated through the filter 11, after the liquid has been modified by dissolving a paramagnetic salt 13 in the liquid. As shown, filter 11 is placed in a steady magnetic field 17. The dissolved paramagnetic ions cause the liquid to take on, for example, a paramagnetic susceptibility which is controlled by the amount of salt dissolved in the liquid. If, for example, a predetermined amount of a paramagnetic salt, such as manganese chloride, is dissolved in water, small particles that are either diamagnetic or non-magnetic can be removed by means of a high gradient magnetic filter.

In like manner, the liquid carrier can be modified by dissolving a diamagnetic substance therein. Such a diamagnetic substance can be, for example, bismuth diiodide (BiI$_2$). In addition, the fluid utilized can be other than water (for dissolving either a paramagnetic salt or a diamagnetic substance therein) and can be, for example, alcohol or glycerine.

Such a filter can be made selective allowing one type of particle to pass through whereas other particles will be captured simply, as one possibility, by making the susceptibility of the liquid identical to that of the particles to be allowed to pass through. Selective separation is possible over a limited but nevertheless fairly wide range of magnetic particles.

The salt to be dissolved in the liquid can be diamagnetic or paramagnetic as needed and the quantity can be adjusted to achieve the desired result. This new method of separation will work in conventional high gradient magnetic separation filters or any type of filter in which magnetic field gradients are used to separate out particles regardless of the method by which the magnetic gradients are obtained.

Figures 2, 3:
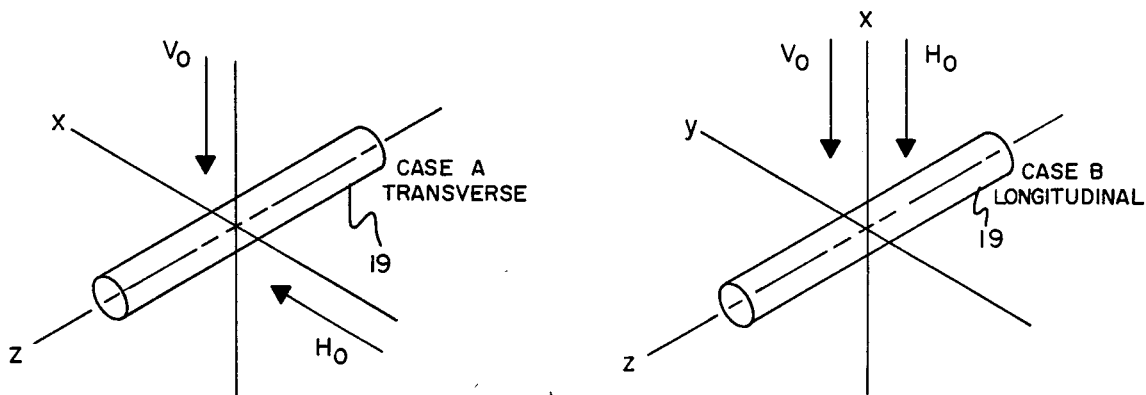
FIGS. 2 through 4 are perspective views of a wire showing the flow and magnetic field orientations relative to such a wire when used for collection purposes.

Hence, a modification of the liquid carrier can be used, for instance, in open gradient magnetic separators to enhance or modify the forces acting on the particles passing through the device. This method can also be used effectively in filters deriving their fields from iron-clad magnets or from superconducting coils. The forces on diamagnetic or paramagnetic particles can be effectively controlled by this method in all configurations commonly used as axial, transverse and longitudinal field filters, as illustrated in FIGS. 1 through 3, or in configurations that are combinations of the above.

A liquid, or carrier, can be made by dissolving, for example, MnCl$_2$ (manganese chloride) in water, and the magnetic susceptibility can be controlled over a considerable range by the amount of manganese chloride dissolved in the water (or other liquid). Steel wool (or similar ferromagnetic material with sharp edges) placed in a magnetic field is used to capture the diamagnetic, non-magnetic or very weakly paramagnetic particles. The capture efficiency depends upon the relative difference of the magnetic properties (susceptibilities) of the particles and the fluid.

To separate diamagnetic particles from paramagnetic particles, enough manganese chloride is dissolved in the water to make the magnetic susceptibility of the water equal to that of the paramagnetic particles. These particles then pass through the magnetized steel wool filter since the net attractive force on them will be zero. However, the diamagnetic particles will be captured in the filter at the sharp edges of the filter which lie in a direction pointing at right angles to the applied field (idealized). These edges repel paramagnetic particles but attract diamagnetic particles. The fibers of the collecting matrix must meet new conditions for optimum filtering of diamagnetic particles. In practice, the shape of the wire is optimized for the particular use, and optimizaton can be calculated from classical electromagnetic field studies (see, for example, W. R. Smythe, "Static and Dynamic Electricity", McGraw-Hill, 1950 (2nd Ed.) for analogous examples of field calculations for electrostatics).

Figure 4:
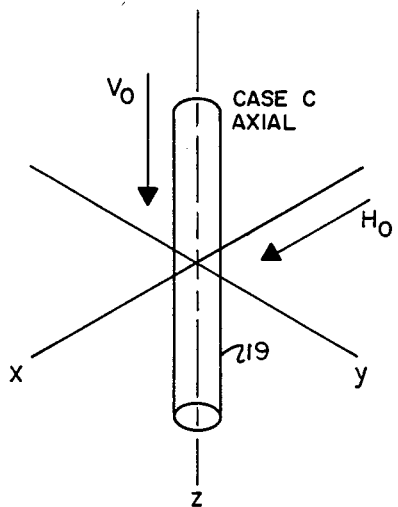

It should be noted that the filter can be arranged in arrays of well known geometries employed in conventional high gradient magnetic separation. The arrangement of the filter strands 19 in a field parallel to the field flow (i.e., a longitudinal filter, as shown in FIG. 3 for a Case B filter for conventional HGMS), will cause transverse collection in the invention disclosed herein, or in other words, will have particle collection as shown for a transverse filter (case A as shown in FIG. 2). In a third geometry, referred to as an axial filter (Case C as shown in FIG. 4), the collection on strand 19 will be rotated through a 90° angle as compared to capture in conventional (paramagnetic or ferromagnetic) high gradient magnetic separation.

The one-dimensional force on an isotropic magnetic particle can be written for $\chi$, for example, as $$F_x = \chi V H \frac{\partial H}{\partial x} \quad (1)$$

where $\chi$ is the relative susceptibility $\chi_p - \chi_f$, i.e., the difference between the particle susceptibility and that of the fluid medium surrounding it. The force depends on the relative susceptibility, the volume of the particle V, the magnetic field H and the field gradient. The derivation of this expression from the magnetic energy of a magnetized particle in a field appears in the prior art.

When the susceptibility of a particle is small, as in the case for diamagnets, the fluid medium cannot be ignored because its susceptibility is likely to be of the same order of magnitude. This is shown in Table 1 set forth hereinafter where the diamagnetic susceptibility of water is shown to be of the same order of magnitude as the minerals listed depending on the relative magnitude of the susceptibility for the materials listed.

TABLE I

| Compound | $\chi_{mole} \times 10^{-6+}$ (cgs) | $\chi_{vol} \times 10^{-6}$ (cgs) | wt. % |
|---|---|---|---|
| Al$_2$(SO$_4$)$_3$ | −93.0 | −0.46 | |
| Al$_2$(SO$_4$)$_3$·18H$_2$O | −323.0 | −0.825 | |
| K$_2$SO$_4$ | −67.0 | −1.02 | 50 |
| KAl(SO$_4$)$_2$ | | | |
| SiO$_2$** | −29.6 | −1.23 | 50 |
| Fe$_2$O$_3$ | strongly positive | | 0.1 |
| FeS$_2$ | complex | | 0.01 |
| H$_2$O | ~ −13 | −0.72 | |

*Alunite, KAl$_3$(SO$_4$)$_2$(OH)$_6$ about 37% alumina$^2$
**Density depends on crystalline form
+From Tables de Constantes et Données Numeriques, Vol. 7, Diamagnetisme et Paramagnétisme par G. Foëx, Masson and Cie., Paris, 1957

Depending on the relative magnitudes of the susceptibilities and their signs, a particle may act as if it were paramagnetic or diamagnetic or as if it had no magnetic moment at all. Because the particle in a fluid displaces an equal volume of that fluid, the susceptibility should be expressed as volume susceptibility as given in Table I. On this basis, silica in water would have a relative susceptibility of $(-1.23+0.72)\times 10^{-6}$ or $-0.51\times 10^{-6}$ cgs and would act as a diamagnet. Aluminum sulfate, on the other hand, with a value for the relative susceptibility of $+0.26\times 10^{-6}$ would behave as a paramagnet.

This result allows for two important considerations in magnetic separation. First, diamagnetic materials can be collected as if they were paramagnetic by suspending them in a more diamagnetic liquid. Thus as shown hereinabove, diamagnetic materials can be collected in regions of negative magnetic field gradients which exist at right angles to the applied field near a ferromagnetic matrix wire in addition to the regions of positive gradient. If, on the other hand, a paramagnetic fluid were used as a carrier for a diamagnetic particle species, a sizable difference in susceptibilities can be achieved and a satisfactory diamagnetic separation made. Second, a highly selective magnetic filter can be operated in which two particle systems of different susceptibilities can be separated even if the difference of magnetic properties is small. The susceptibility of the carrier fluid is chosen or made to be the same as tht of one of the particulates, leaving only the other to exhibit its apparent magnetism.

The collection of diamagnetic particles on a nickel wire in a magnetic field has been carried out. Since the sign of the force on a diamagnetic particle in a magnetic field gradient is opposite to that on a paramagnetic particle, collection will take place in the two quadrants which repel paramagnetic particles. Collection will center on an axis at right angles to the direction of the applied field.

Retaining the nomenclature coined for paramagnetic collection as set forth in FIGS. 2 through 4 and as distinguished between three configurations: (1) In Case A, the field and slurry flow are perpendicular to each other, and to the axis of the collecting strand 19 (transverse case); (2) In Case B, the field and slurry flow are parallel to each other and perpendicular to the axis of the collecting strand 19 (longitudinal case); and (3) In Case C, flow is parallel and the field is perpendicular to the axis of collecting strand 19 (axial case).

In the idealized case, collection of diamagnetic particles for Case A appears like the collection of paramagnetic particles in Case B and vice versa. In Case C, collection also centers along an axis at right angles to the field direction. It is to be realized that in practice, intermediate configurations are likely to occur.

The theory is as follows: the force $\vec{F}_m$ on a spherical particle, volume $v_p$, volume susceptibility $\chi_p$, immersed in a fluid with volume susceptibility $\chi_f$, is given by $$\vec{F}_m = v_p(\vec{M}_p \cdot \nabla)\vec{H} \quad (2)$$

where the magnetization of the particle, $\vec{M}_p$, is given by:

$$M_p = \frac{\mu_0(\chi_p - \chi_f)H}{1 + \frac{\chi_p - \chi_f}{3}} \quad (3)$$

$\vec{H}$ is the magnetic field intensity which results at the center of the particle (assumed to be small in size) from the application of a field $H_o$ to a cylindrical nickel wire of radius a.

The force $F_{mr}$ on the particle in the radial direction at a distance r from center of wire for $\chi_f << 1$ which is always satisfied in the situations discussed here is found to be $$F_{mr} = -\frac{(\chi_p - \chi_f)v_p}{r^3} M_s a^2 \left[ \frac{M_s}{2\mu_o} \frac{a^2}{r^2} + H_o \cos 2\theta \right] \quad (4)$$

for $2\mu_o H_o > M_s$, saturation magnetization of nickel wire, and $$F_{mr} = -\frac{(\chi_p - \chi_f)v_p}{r^3} 2\mu_o H_o^2 a^2 \left[ \frac{a^2}{r^2} + \cos 2\theta \right] \quad (5)$$

for $2\mu_o H_o \leq M_s$.

To attract and collect particles on the wire $F_{mr}$ must be negative. $\chi_f = -0.72 \times 10^{-6}$ cgsemu/cc/Oe for water and $\chi_p$ is larger than 0 for the paramagnetic case, so that $F_{mr} < 0$ when $$\left( \frac{a^2}{r^2} k + \cos 2\theta \right) > 0 \quad (6)$$

where $$k = \frac{M_s}{2\mu_o H_o}$$

for $2\mu_o H_o > M_s$ and $k=1$ for $2\mu_o H_o \leq M_s$. At the surface of the collecting nickel wire $a \simeq r$ so that an angle $\alpha$ can be found which defines two quadrants each subtending an angle $2\alpha$ in which attractive forces occur, with $\alpha$ ranging from 45° for $k \to 0$ ($H_o \to \infty$) to 90° for $k=1$ (actually $\alpha < 90°$ even for $k=1$ since r is larger than a by the particle radius, even at the surface of the wire).

For many diamagnetic particles $\chi_p \leq \chi_f$ so that $\chi_p - \chi_f$ is zero or a small negative number. Hence, there is an extremely weak attractive force in the region on the collecting wire where there was a repulsive force for paramagnetic particles. However, the force is generally so small that little or no capture of diamagnetic particles is observed in HGMS.

Figure 5:
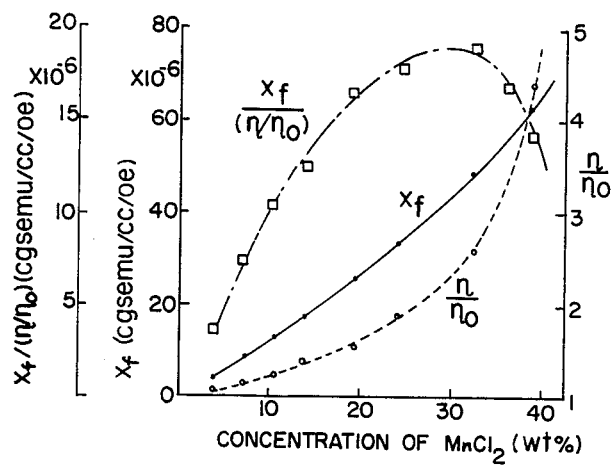
FIGS. 5 through 7 are graphs illustrating the invention.

To increase the attractive force, the quantity $|\chi_p - \chi_f| = \chi$ can be made much larger by dissolving a paramagnetic salt in the water. With the paramagnetic ions in solution, $\chi_f$ can be made positive, and to assume values as large as or larger than those commonly encountered for paramagnetic particles which are now being successfully separated by HGMS. In the collection process the magnetic velocity, $v_m$, ($v_m = 2\chi M_s H_o b^2/9\eta a$ where b is the particle radius and $\eta$ the viscosity of the fluid) plays an important role with large values of $\chi/\eta$ improving collection. Since $\chi \simeq |\chi_f|$ for this case the magnitude of $\chi_f/(\eta/\eta_o)$ is examined to "optimize" the paramagnetic fluid for collecting the diamagnetic particles. In FIG. 5, calculated values for $\chi_f$ and room temperature measured vales of $\eta/\eta_o$ obtained by using an Ostwald-Fenske viscometer are given as a function of the weight percent of MnCl$_2$, a paramagnetic salt, dissolved in water ($\eta_o$ is the viscosity of water at room temperature).

The calculation of $\chi_f$ is carried out by using the following relation which should be sufficiently accurate in the region considered where the paramagnetic manganese ions essentially determine the susceptibility:

$$\chi_f \simeq \rho_f [c_m \chi_{ms} + (1 - c_m) \chi_{mw}] \quad (7)$$

where $\rho_f$ is the density of the fluid, $c_m$ is the weight concentration of the paramagnetic salt (here MnCl$_2$) and $\chi_{ms}$ and $\chi_{mw}$ are the weight susceptibilities of the paramagnetic salt ($\chi_{ms} = 116.4 \times 10^{-6}$ cgsemu/g/Oe) and water ($\chi_{mw} \simeq \chi_w$ as given above), respectively.

Collection processes were studied by means of a closed circuit TV system. Measurements were made using Al ($\chi_p = 1.65 \times 10^{-6}$ cgsemu/cc/Oe, density = 2.70, $b_{ave} = 5$ μm)$^6$ or Al$_2$O$_3$ ($\chi_p = -1.44 \times 10^{-6}$ cgsemu/cc/Oe, density = 3.97, $b_{ave} = 7$ μm) particles in the slurry. Typical results are set forth with respect to FIG. 6, with the experimental parameters given in the caption. The flow velocity, v, was measured near the center of the collection tube.

Figure 6:
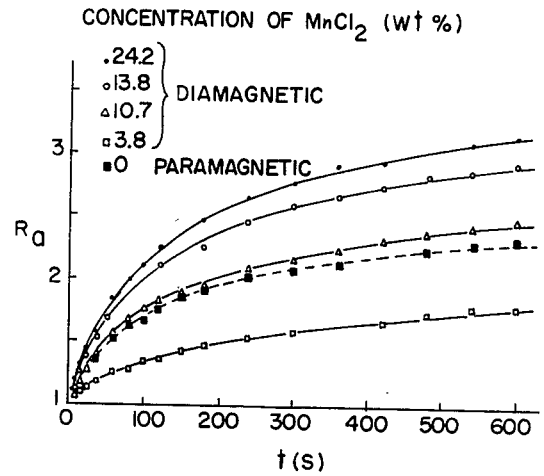

In FIG. 6, the measured, normalized buildup radius $R_a$ (buildup radius divided by collecting wire radius) is given as a function of time for a number of values of $\chi$ which can be obtained from FIG. 5, for Case C. Note that one set of measurements is for paramagnetic collection.

Figure 7:
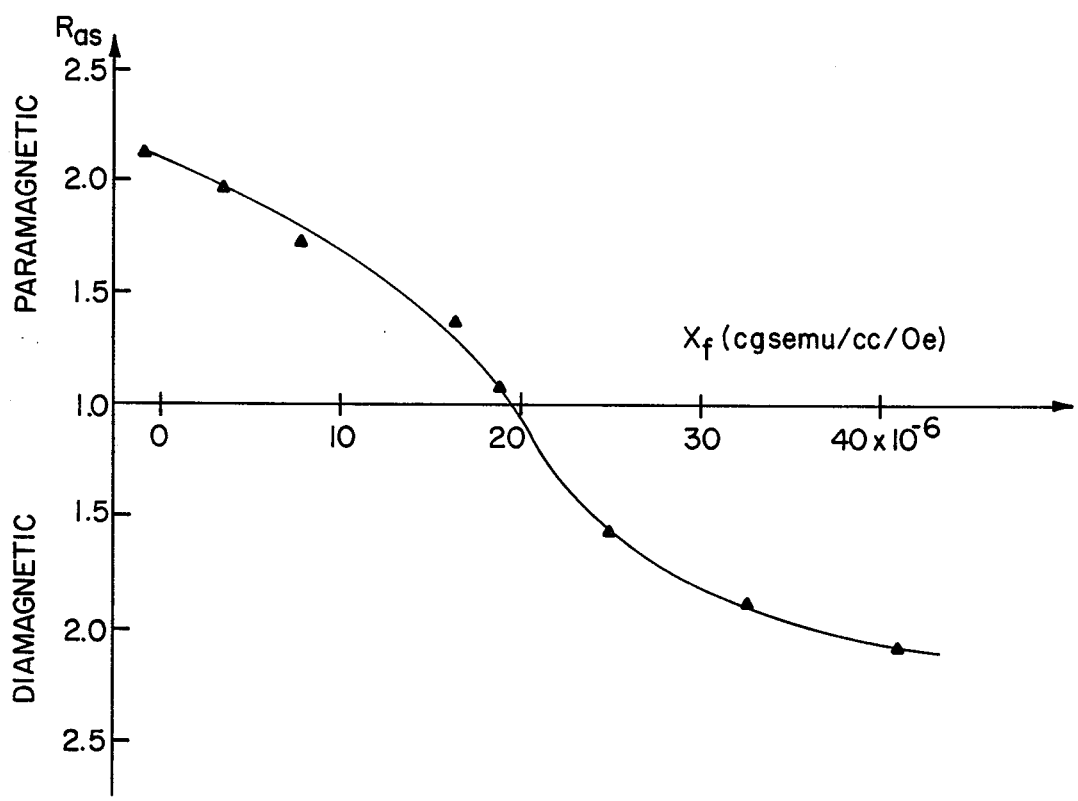

FIG. 7 illustrates a normalized saturation buildup radius $R_{as}$ of CuO on 125 μm nickel wire as a function of susceptibility $\chi_f$ of fluid, varied by changing concentration of MnCl$_2$ dissolved in water used as a carrier fluid by magnetic means, simply by using a multi-step arrangement. In the first step, for example, water can be used as the carrier to separate one group of particles (as, for example, paramagnetic particles) after which the liquid is modified by addition of a paramagnetic or diamagnetic modified fluid to thereafter enable removal of a second group of particles (the second group being particles which could not be removed in the first step as, for example, diamagnetic, non-magnetic, or very weakly paramagnetic particles). A further step could then be utilized by again modifying the fluid to enable removal of yet a third group of particles that could not be removed by the first two steps.

Thus, this invention provides a novel method and apparatus for separating particles not heretofore possible as well as enabling selective separation of particles.

What is claimed is:

1. A method for magnetically separating particles from a liquid, said method comprising:

modifying a liquid having particles to be separated therein by addition of a diamagnetic material to modify said liquid so that said liquid is thereby made a predetermined diamagnetic liquid relative to particles therein;

establishing a magnetic field;

placing magnetic material having curved surfaces in said magnetic field to establish a high gradient magnetic field related to said curved surfaces so that said magnetic material acts as a particle filter therein; and passing said modified liquid through said magnetic material in a direction relative to said magnetic material and said magnetic field so as to cause attraction of said particles to said magnetic material while allowing passage of said modified liquid past said magnetic material to thereby achieve separation of said particles from said modified liquid.

2. The method of claim 1 wherein said diamagnetic substance is bismuth diiodide.

3. The method of claim 1 wherein said magnetic material is a ferromagnetic material forming a matrix in said magnetic field to thereby establish said high gradient magnetic filter.

4. The method of claim 1 wherein said liquid is modified so at least one portion of said particles are diamagnetic relative to said modified liquid whereby said one portion of said particles are attracted to said magnetic material at right angles with respect to attraction of particles in said liquid that are paramagnetic with respect to said modified liquid.

5. The method of claim 1 wherein said liquid is modified to vary the magnetic susceptibility of said liquid whereby selective filtering of said particles is provided.

6. A method for magnetically separating particles from a liquid, said method comprising:

modifying a liquid, having particles to be separated and particles to be retained therein, to vary the magnetic susceptibility of said liquid by addition of at least one of a paramagnetic salt and a diamagnetic substance with the susceptibility of said liquid being controlled by the amount of said one of said paramagnetic salt and diamagnetic substance dissolved in said liquid so that the susceptibility of said liquid is made substantially identical to that of said particles to be retained in said liquid;

placing magnetic material having curved surfaces in said magnetic field to establish a high gradient magnetic field related to said curved surfaces so that said magnetic material acts as a particle filter therein; and passing said modified liquid through said magnetic material in a direction relative to said magnetic material and said magnetic field so as to cause attraction of said particles to be separated to said magnetic material while allowing passage of said modified liquid and particles to be retained in said liquid past said magnetic material to thereby achieve separation of said particles to be separated from said modified liquid.

7. The method of claim 6 wherein said selective filtering includes at least three steps with two of said steps utilizing addition of said paramagnetic salt and diamagnetic substance.

8. A method for magnetically separating particles from a liquid, said method comprising:

dissolving a predetermined one of a paramagnetic salt and a diamagnetic substance in a liquid having particles therein to be separated to thereby modify the magnetic susceptibility of said liquid so that said modified liquid has a magnetic susceptibility unlike at least predetermined particles therein, the amount of said one of a paramagnetic salt and a diamagnetic substance dissolved in said liquid being sufficient to make the susceptibility of said liquid substantially identical to that of particles to pass through said filter whereby selective filtering of particles is provided;

establishing a magnetic field;

placing magnetic material having curved surfaces in said magnetic field to form a high gradient magnetic field related to said curved surfaces so that said magnetic material acts as a particle filter therein; and passing said modified liquid through said filter in a direction relative to said magnetic material and said magnetic field so as to cause attraction of said predetermined particles to said magnetic material while passing said modified liquid and particles other than said predetermined particles to thereby achieve separation of said predetermined particles from said modified liquid and particles other than said predetermined particles.

9. The method of claim 8 wherein said magnetic material is a ferromagnetic material forming a matrix in said magnetic field to thereby establish said high gradient magnetic filter.

10. The method of claim 8 wherein said paramagnetic salt is manganese chloride.

11. The method of claim 8 wherein said diamagnetic substance is bismuth diiodide.

12. The method of claim 11 wherein said particles are at least one of diamagnetic, non-magnetic and very weakly paramagnetic particles.

13. A method for selective separation of particles in a liquid, said method comprising:

modifying a liquid having at least one group of particles therein which are to be separated from said liquid and at least a second group of particles in said liquid, said liquid being modified by adjusting the magnetic susceptibility of said liquid to be substantially identical to that of said second group of particles;

establishing a magnetic field;

placing a magnetic matrix in said magnetic field to form a high gradient magnetic filter; and passing said modified liquid through said filter in a direction relative to said magnetic matrix and said magnetic field so as to cause separation of said one group of particles from said modified liquid and said second group of particles by attraction of said particles of said one group to said magnetic matrix.

14. The method of claim 13 wherein said liquid is modified by the addition of a paramagnetic salt so that said modified liquid is paramagnetic.

15. The method of claim 13 wherein said liquid is modified by the addition of a diamagnetic substance so that said modified liquid is diamagnetic.

16. The method of claim 13 wherein said liquid is one of water, alcohol and glycerine.

* * * * *

UNITED STATES PATENT AND TRADEMARK OFFICE
CERTIFICATE OF CORRECTION

PATENT NO.   : 4,560,484
DATED        : December 24, 1985
INVENTOR(S)  : Friedlaender et al.

It is certified that error appears in the above—identified patent and that said Letters Patent is hereby corrected as shown below:

Column 5, line 62, change "tht" to --that--.

Column 6, line 33, insert an arrow ($\rightarrow$) over M and H (in the mathematical expression set forth).

Column 7, line 5, change "$\leq$" to --$\geq$--.

Signed and Sealed this

Fifteenth Day of July 1986

[SEAL]

Attest:

DONALD J. QUIGG

Attesting Officer

Commissioner of Patents and Trademarks